United States Patent
Schmidt et al.

(10) Patent No.: US 6,497,097 B2
(45) Date of Patent: Dec. 24, 2002

(54) TURBOCHARGED ENGINE HAVING ENGINE COMPRESSION BRAKING CONTROL

(75) Inventors: Erwin Schmidt, Baltmannsweiler (DE); Siegfried Sumser, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/100,038

(22) Filed: Mar. 19, 2002

(65) Prior Publication Data

US 2002/0092300 A1 Jul. 18, 2002

Related U.S. Application Data

(62) Division of application No. 08/933,088, filed on Sep. 18, 1997.

(30) Foreign Application Priority Data

Sep. 18, 1996 (DE) ......................................... 196 37 999

(51) Int. Cl.[7] ........................... F02B 37/12; F02D 13/04
(52) U.S. Cl. ......................................... 60/602; 123/320
(58) Field of Search ........................... 60/602; 123/320, 123/321, 322

(56) References Cited

U.S. PATENT DOCUMENTS

| | | |
|---|---|---|
| 5,088,348 A | 2/1992 | Hiramuki |
| 5,091,857 A | 2/1992 | Katayama et al. |
| 5,146,890 A * | 9/1992 | Gobert et al. ............... 123/321 |
| 5,193,657 A | 3/1993 | Iizuka |
| 5,410,882 A | 5/1995 | Davies et al. |
| 5,444,980 A * | 8/1995 | Dellora et al. ............... 60/602 |
| 5,619,965 A * | 4/1997 | Cosma et al. ............... 123/322 |
| 5,813,231 A * | 9/1998 | Faletti et al. ................ 60/602 |
| 5,967,115 A * | 10/1999 | Konopka et al. .......... 123/322 |

FOREIGN PATENT DOCUMENTS

| | | |
|---|---|---|
| DE | 39 35 367 A1 | 4/1991 |
| DE | 195 07 622 A1 | 9/1995 |
| DE | 44 25 956 A1 | 1/1996 |
| EP | 0 292 010 | 11/1988 |
| JP | 64-60727 | 3/1989 |

\* cited by examiner

*Primary Examiner*—Michael Koczo
(74) *Attorney, Agent, or Firm*—Crowell & Moring LLP

(57) ABSTRACT

An engine brake for a supercharged internal combustion engine for driving a motor vehicle is operated such that the working gas compressed during engine braking, prior to the end of the expansion cycle, is drawn at least partially from the working chambers of the engine through at least one throttle valve, with an exhaust turbocharger of the engine having an exhaust turbine with variable turbine geometry. The engine braking power is regulated based upon the travel of the throttle valve and/or an intake cross section of the exhaust turbine as a function of the operating parameters of the internal combustion engine and the vehicle driving speed. Upon issuance of a signal indicating a braking performance requirement from the driver, the required braking power is applied at least preferably through the engine brake.

2 Claims, 2 Drawing Sheets

TURBOCHARGED ENGINE HAVING ENGINE COMPRESSION BRAKING CONTROL

This application is a divisional of application Ser. No. 08/933,088, filed Sep. 18, 1997, abandoned.

BACKGROUND AND SUMMARY OF THE INVENTION

This application claims the priority of German application 196 37 999.7, the disclosure of which is expressly incorporated by reference herein.

The present invention relates to a method for operating an engine brake and to a device for implementing the method. More particularly, the present invention relates to an engine brake operation method for a supercharged internal combustion engine for driving a motor vehicle, in which working gas that is compressed during engine braking, is drawn off prior to the end of the expansion stroke at least partially from the working chambers of the engine through at least one throttle valve, with an exhaust turbocharger of the engine having an exhaust turbine with variable turbine geometry.

DE 39 35 367 A1 describes a method for operating an engine brake for a supercharged internal combustion engine for driving a motor vehicle. Working gas compressed in engine braking operation, prior to termination of the expansion stroke, is extracted at least partially from the working chambers of the internal combustion engine through a throttle valve, with an exhaust line being cut off from the atmosphere and with all of the working gas leaving the working chambers in all operating strokes being fed back in a closed circuit with correspondingly increased pressure to be drawn in once more. In addition, the exhaust turbocharger of the engine has a variable turbine geometry to achieve a boost pressure during engine braking operation that is as high as possible. Additional background subject matter can be found in DE 44 25 956 A1; U.S. Pat. No. 5,091,857; U.S. Pat. No. 5,193,657; and JP 1-60727 (A).

An object of the present invention is to provide a method for operating an engine brake and a device for implementing the method such that engine braking can be achieved with a wider range of application as well as a significant reduction in the wear on the mechanical wheel brakes.

This object has been achieved according to the present invention by a device and method which regulates engine brake power by a regulating device. The device regulates a travel of the throttle valve and/or an intake cross section of the exhaust turbine as a function of operating parameters of the internal combustion engine and of the speed of the vehicle, and the required engine braking power is applied at least preferably through the engine brake by way of the regulator device when there is a signal indicating a braking power requirement by the driver.

One advantage of the method and device according to the invention arises from a predetermined distribution within a certain range or bandwidth of the total braking power between the engine braking power and the mechanical wheel braking power as a result of the throttle valves (exhaust valves and/or decompression valves) regulated variably in terms of valve cross section as a function of the operating parameters of the engine at a corresponding engine rpm.

Another advantage of the present invention arises from a reduction of the influence of temperature on the exhaust system, with the driver employing a corresponding braking power demand to use the variable engine brake.

Still another advantage of the present invention is the ability to time the opening of the valves for the top dead center position of the compression cycle to achieve an increase in engine braking power.

In addition, by virtue of the variably adjustable throttle valve cross section, the volume of air in the engine cylinder which goes through the expansion stroke is determined. Because the ratio between the volume of air leaving the cylinder through the exhaust valves prior to the top dead center position at the end of the compression stroke and the volume of air that remains in the cylinder during the next expansion stroke determines the braking power level, the latter is co-determined by the variable throttle valve cross section directly.

As a result of the high boost obtained during engine braking operation, the charger rpm is at a high level so that, immediately after the braking process, a sufficiently large volume of air is available for firing the engine. Thus, a smoking problem does not occur during the acceleration phase even with the large volume injected.

The present invention achieves maximum engine braking performance by storing the values for the throttle valve travel and the values for the exhaust turbine intake cross section as a function of certain operating parameters of the engine such as rpm, turbine intake pressure, boost air pressure, and ambient temperature for example are stored in an electronic characteristic field. Thereby, these values can be read out from the characteristic field as a function of currently measured engine operating parameters to regulate the engine brake.

The method according to one embodiment of the present invention can be used with particular advantage because the driver during normal driving usually sets the braking power requirement by operating the brake pedal for the mechanical wheel brakes. At this point, the sensor which detects the braking power requirement can also evaluate an intensity (operating speed) for the operation of the mechanical wheel brake possibly in order to provide increased engine braking power immediately.

Another advantage of the present invention is an increase in safety because use of the hand brake during driving activates the maximum possible engine braking power possible with the current operating parameters of the engine. In addition, further redundancy for activating the engine brake can be achieved by using an emergency button.

In the event of deviations from the actual value from the set point that are too great, the present invention detects an error, and the driver is notified by a visual display and/or an acoustic signal that there is an error in the engine braking system and that the vehicle should visit a repair garage. The computer in the engine braking system logs this state. These data can only be deleted at the garage or supplemented by records of the repairs performed.

A considerable reduction in the wear on the mechanical wheel brakes is achieved by the present invention in that, largely independently of the frequency and intensity of the operation of the mechanical wheel brakes by the driver, the total braking power is provided for the most part by the engine brake.

Another advantageous aspect of the present invention protects the valves by minimizing exhaust temperature stress. In addition, by closing the throttle valve in phases, intermediate cooling of the exhaust system can be achieved with relatively high engine braking power. Moreover, the stress imposed by the exhaust temperature can be reduced further if the prevailing rpm conditions permit shifting down to a lower speed.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
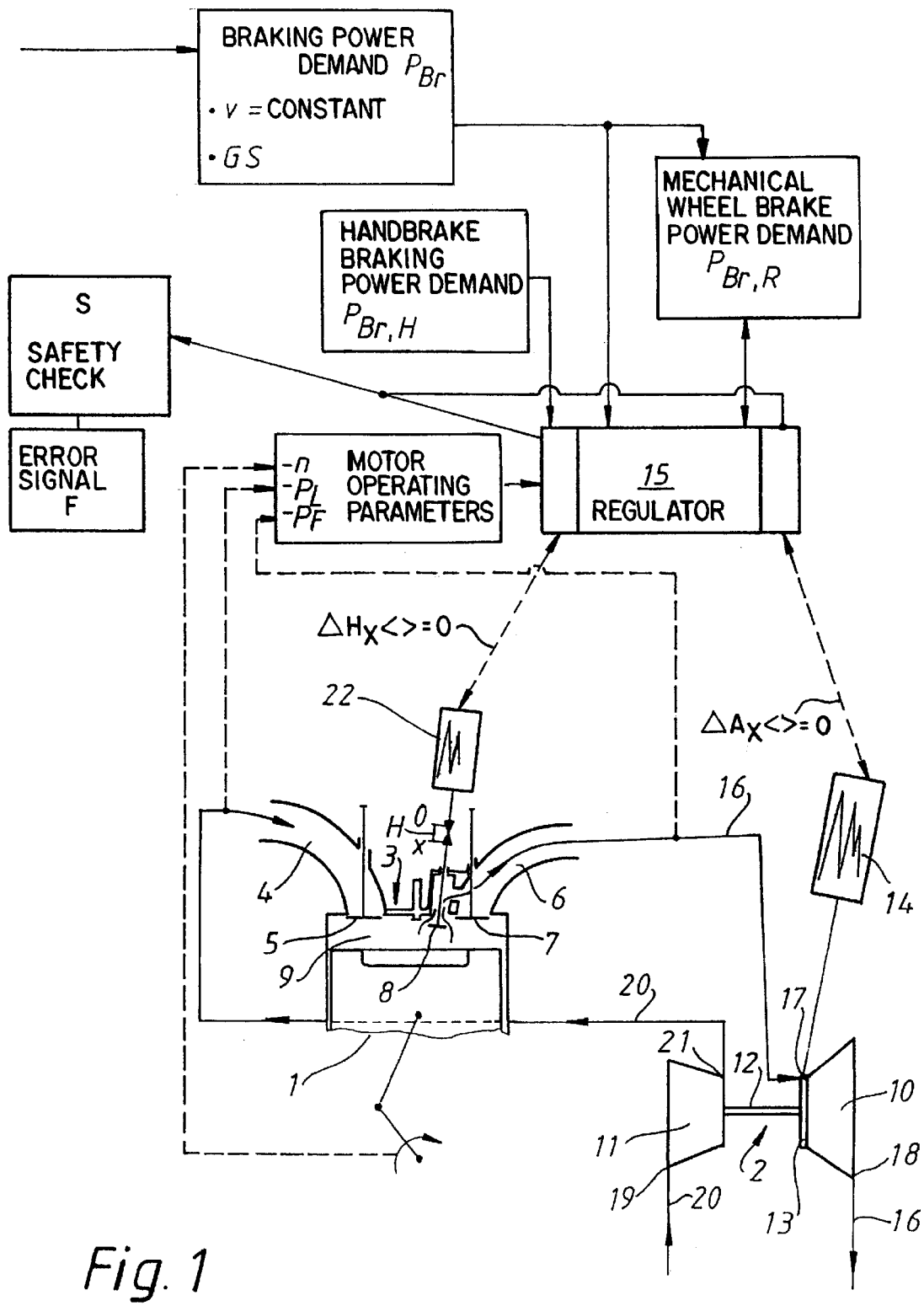
FIG. 1 is a schematic diagram of an engine braking device according to the present invention, having a cylinder of a multicylinder internal combustion engine and an exhaust turbocharger whose exhaust turbine, in addition to variable guide blades, is connected with an exhaust side and whose boost air compressor is connected with an intake side of the internal combustion engine, with a throttle valve being located in the cylinder and with the throttle valve and the variable guide blades being capable of being regulated by a regulating device in addition to a positioning device, with the regulating device obtaining input signals from the operating parameters of the internal combustion engine and from the vehicle speed.

In FIG. 1, only one cylinder 1 of the multicylinder engine is shown, and this cylinder is connected with an exhaust turbocharger 2. An intake manifold 4, an intake valve 5 and an exhaust manifold 6 with exhaust valve 7 are provided in the cylinder head 3 of the cylinder 1. Between intake manifold 4 and exhaust manifold 6, a throttle valve 8 (decompression valve) is arranged such that, when it opens, a working chamber 9 of cylinder 1 is flow connected with the exhaust channel 6.

A travel $H_x$ of the throttle valve 8 is incrementally adjustable by a regulator 15 and a positioning device 22. The regulator 15 obtains operating parameters from the internal combustion engine and input signals which represent braking power requirements of the driver, and processes these signals into signals for travel $H_x$ of throttle valve 8. During engine braking, compressed working gas is drawn off prior to the end of the expansion stroke of engine 1 from the working chamber 9 through the open throttle valve 8.

The exhaust turbocharger 2 comprises an exhaust turbine 10 and a boost air compressor 11, both of which are nonrotatably connected (i.e, fixed) with a shaft 12. Exhaust turbine 10 has variable guide blades 13 which are generally known by way of which the intake cross section for the exhaust flowing to the impeller of exhaust turbine 10 can be regulated. The adjustment of intake cross section $A_x$ of the variable guide blades 13 is accomplished by a positioning device 14 likewise controlled by the regulator 15.

The exhaust manifold 6 is connected through an exhaust line 16 with an inlet stub 17 of the exhaust turbine 10 having an outlet stub 18 which leads to an exhaust line. An inlet side 19 of the boost air compressor 11 is connected with a boost air line 20. From a pressure side 21 of boost air compressor 11, the boost air line 20 runs to the intake manifold 4.

The regulator 15 operates the engine brake according to the below-described method as a function of the incoming signals for the operating parameters of the engine (rpm n, boost pressure $P_L$, turbine inlet pressure $P_E$), and of the braking power demand $P_{Br}$ of the mechanical wheel brakes $P_{Br,R}$ or the handbrake $P_{Br,H}$, and other input signals (danger situation GS, driving speed $V_F$). When the safety check S has been performed to determine the engine braking effect of the valve travel $H_x$ and adjustment of the intake cross section $A_x$ with known actual values relative to previously known setpoints, an error signal F is output and indicates to the driver a defective functioning of the engine braking device.

In addition, the variable guide blades 13 of the exhaust turbine 10 are incrementally adjustable by the regulator 15 and an adjusting device 14 in terms of throughput cross section and/or its swirl. The regulator 15 obtains operating parameters of the engine and the braking power requirements from the input signals representing the driver and processes these parameters to produce signals to adjust the guide blades 13.

Figure 2:
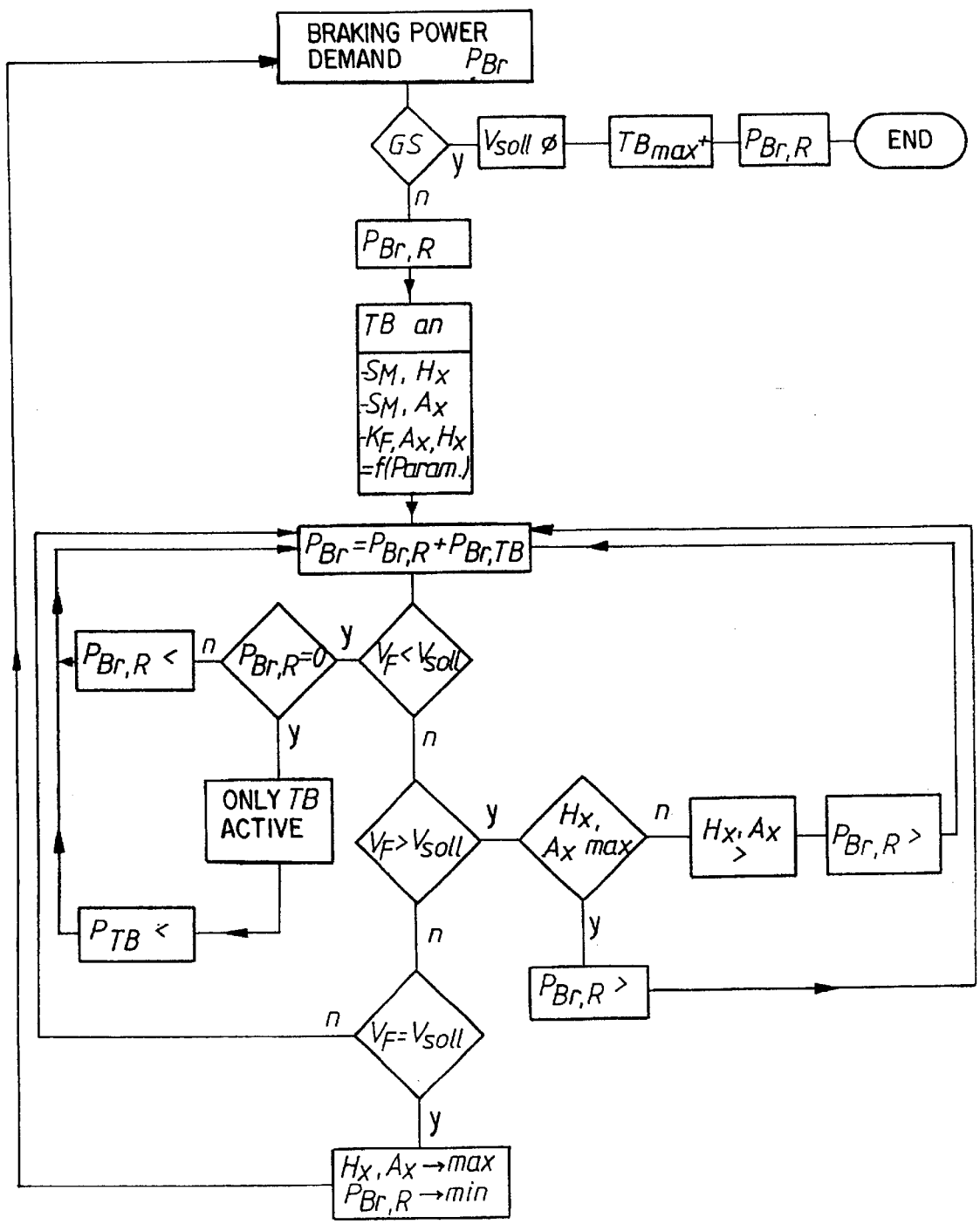
FIG. 2 is a flowchart of an engine braking process according to the invention which is implemented by the device shown in FIG. 1.

With reference now to the method according to the invention for operating an engine brake according to FIG. 2, there is, at the beginning of the process, a demand for braking power which usually comes when the driver actuates the brake pedal of the mechanical wheel brake, for example when keeping driving speed constant when driving down hill or when adjusting to the flow of traffic. The braking power requirement is, however, also detected by a brake button, an emergency brake button, a handbrake and the like.

Initially a check is performed to determine whether a dangerous situation GS has been detected. This is the case if the signal representing the braking power requirement at a road speed $V_F>0$ is a signal from an emergency brake button or the handbrake or if the actuating speed of the brake pedal exceeds a predetermined value (panic value). If GS is detected, the set speed $V_{Soll}=0$ is set. The regulator 15 regulates the maximum possible engine braking power which is possible under then current engine operating parameters, in which the travel $H_x$ of the throttle valve 8 is opened to the maximum toward the end of the compression stroke and until the end of the expansion stroke, and then the throttle valve 8 is closed during the intake stroke. The intake cross section $A_x$ of the guide blades is accordingly reduced corresponding to the exhaust mass flow to achieve a higher turbine inlet speed for the exhaust. Another option when a dangerous situation is recognized involves controlled, very early fuel injection during the compression stroke long before TDC is reached, with the engine braking power being further increased as a result.

If no dangerous situation has been detected, normal braking takes place when the mechanical wheel brake or the engine brake button is actuated. In the latter case, direct braking with the engine brake takes place, with the maximum possible engine braking power being applied on the basis of the engine operating parameters. When braking with a mechanical wheel brake, engine braking is automatically triggered, as a result of the pressure exerted by the driver on the pedal. In other words, the electronic characteristic fields for the throttle valve travel $H_x$, and possibly the intake cross section $A_x$ of the variable guide blades 13, are read out as a function of then current engine operating parameters. Then the positioning motor 22 opens the throttle valve 8 by the read-out value $H_{x,mx}$. The positioning motor 14 closes the variable guide blades 13 by a value $A_{x,mx}$. The subscript mx represents the dependence of the values of $H_x$, $A_x$ on the engine operating parameters. The adjustment of the intake cross section $A_x$ is optional, with regulation of the throttle valve travel $H_x$ being sufficient to carry out the present invention.

Upon receipt of a signal indicating a braking power demand on the driver's part, the regulator 15 allows the required braking power to be applied at least preferably through the engine brake. In other words, the engine braking power is built up while the mechanical wheel brake power is reduced, so that, the braking power felt by the driver remains the same.

If the desired speed value $V_{soll}$ desired by the driver has already been undershot for driving speed $V_F$, the mechanical wheel brake will be triggered accordingly. Accordingly, the engine braking effect will also be reduced.

As long as the desired speed value $V_{soll}$ for deriving speed $V_F$ has not yet been reached, the driver will increase the mechanical braking power. If the maximum possible braking power value is not yet available, $H_{x,mx}$ (and possibly $A_{x,mx}$) will be adjusted toward higher engine braking values. Only when the maximum possible engine braking values for then current engine operating parameters have been reached and a further braking power demand on the driver's part is detected is a corresponding increase in the mechanical wheel braking power permitted.

With a deliberate braking power reduction, the driver accordingly eases off on the brake pedal and the driving speed is then determined to be less than the set speed and the engine braking effect is reduced.

For maximum engine braking power, the values for the travel $H_{x,mx}$ of the throttle valve and/or the values for the intake cross section $A_{x,mx}$ are stored in an electronic characteristic field as a function of preset engine operating parameters. These values can be read out as a function of the operating parameters actually measured.

Preferably the engine braking power is regulated so that, for a required total braking power, the braking power delivered through the engine brake essentially corresponds to the entire braking power and little or no braking power is delivered through the mechanical wheel brakes. The regulator 15 adjusts the values of $H_x$, and possibly $A_x$, such that a minimum power requirement is imposed on the mechanical wheel brakes.

In another embodiment of the invention, the setpoints of throttle valve travel $H_{x,mx}$ and intake cross section $A_{x,mx}$ of the exhaust turbine as well as the engine braking values resulting from these set points for predetermined operating parameters of the engine and driving speeds (test points) are stored in a characteristic field. These setpoints are compared with the actual values obtained during actual engine braking operation for throttle valve travel $H_x$ and intake cross section $A_x$. With a predetermined deviation from the setpoints, an error signal is output which signals to the driver that the engine brake is malfunctioning.

To achieve a relatively low temperature level in the exhaust system by actuating an engine braking button or upon reaching a predetermined temperature in the exhaust system, the throttle valve can be controlled only for short travel distances or for zero travel, while the variable guide blades are set for maximum turbine performance. The temperature level is lowered primarily by the increased amount of fresh precompressed boost air that is delivered by increasing the turbine power using the boost air compressor. The lowering of the temperature level is further supported by increasing the engine rpm n to the extent possible, e.g. by choosing a lower speed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for operating an engine brake with a supercharged internal combustion engine for a motor vehicle in which working gas is compressed during engine braking operation and before end of an expansion stroke is drawn off at least partially from working chambers of the internal combustion engine through at least one throttle valve and an exhaust turbocharger of the engine has an exhaust turbine with variable turbine geometry, comprising a regulator for adjusting travel of the throttle valve, and a positioning device operatively associated with the regulator and the throttle valve such that the regulator obtains and processes operating parameters of the engine and braking power requirements from a vehicle driver as signals to the positioning device for controlling the travel of the throttle valve.

2. The device according to claim 1, wherein the regulator is further configured to adjust the variable guide blades of an exhaust turbine of the exhaust turbocharger via a second positioning device with respect to at least one of throughput cross section and swirl, such that the regulator obtains data in the form of operating parameters of the engine and input signals representing braking power requirements from the vehicle driver and processes the data into signals for adjusting the guide blades.

* * * * *